April 19, 1932.                E. W. LITTLE                1,854,206
                  COMBINED ELECTRODE AND CAGE SHAPER
                 Filed Sept. 4, 1930       3 Sheets-Sheet 1

Inventor
EARL W. LITTLE
By Owen H. Spencer
           Attorney

April 19, 1932.  E. W. LITTLE  1,854,206

COMBINED ELECTRODE AND CAGE SHAPER

Filed Sept. 4, 1930  3 Sheets-Sheet 2

Inventor
EARL W. LITTLE
By Owen H. Spencer
Attorney

April 19, 1932.     E. W. LITTLE     1,854,206
COMBINED ELECTRODE AND CAGE SHAPER
Filed Sept. 4, 1930     3 Sheets-Sheet 3

Inventor
EARL W. LITTLE
By Owen H. Spencer
Attorney

Patented Apr. 19, 1932

1,854,206

UNITED STATES PATENT OFFICE

EARL W. LITTLE, OF INDIANAPOLIS, INDIANA

COMBINED ELECTRODE AND CAGE SHAPER

Application filed September 4, 1930. Serial No. 479,595.

This invention relates to a combined electrode and cage shaping device designed for use in connection with a welding machine as disclosed but not claimed in my copending application, Serial No. 440,295, for welding wire cages and primarily for welding together the wires of bird cages, although it will be understood that the device may be utilized for various other purposes and one feature of the invention is the provision of an electrode wherein a number of welds may be made simultaneously.

A further feature of the invention is the provision of means in connection with the electrodes for properly shaping and spacing the wires prior to welding the same together.

A further feature of the invention is the provision of means for temporarily locking the cage structure in position over the electrodes.

A further feature of the invention is the provision of means for releasing the cage from the electrodes after the welding operation has been completed.

A further feature of the invention is the provision of means for successively positioning the various cage forming wires in position to be welded, whereby bands or the like may be welded to said wires.

A further feature of the invention is the provision of means for adjusting the wire shaping and spacing mechanism with respect to the electrodes to which they are attached.

Other objects and advantages will be hereinafter more fully set forth and pointed out in the accompanying specification.

In the accompanying drawings which are made a part of this application,

Figure 1:
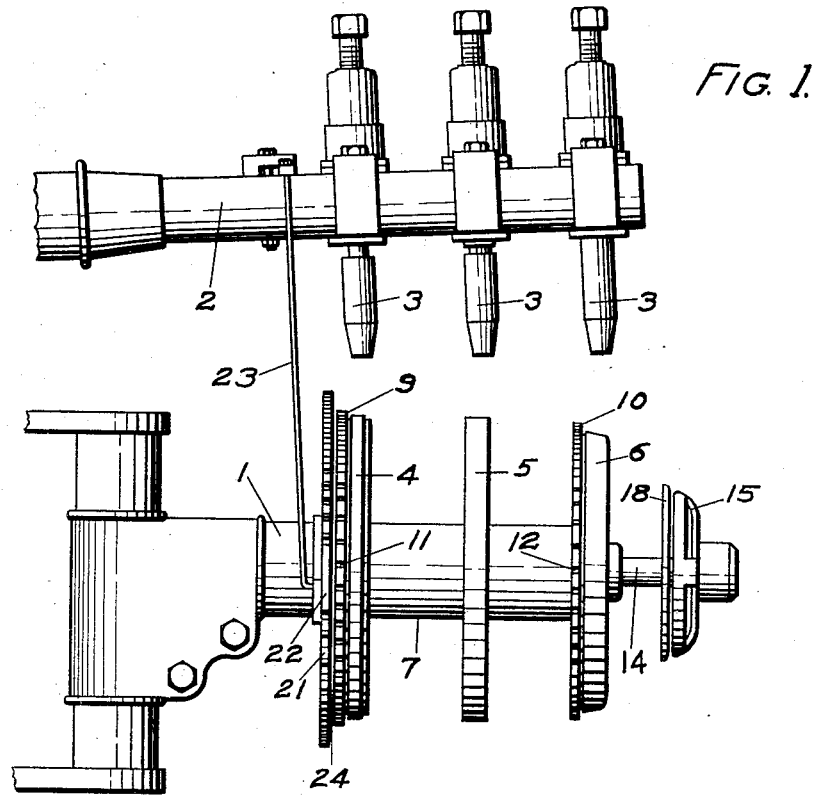
Figure 1 is a side elevation of a portion of a welding machine with the combined electrode and shaping mechanism thereon.
Figure 2:
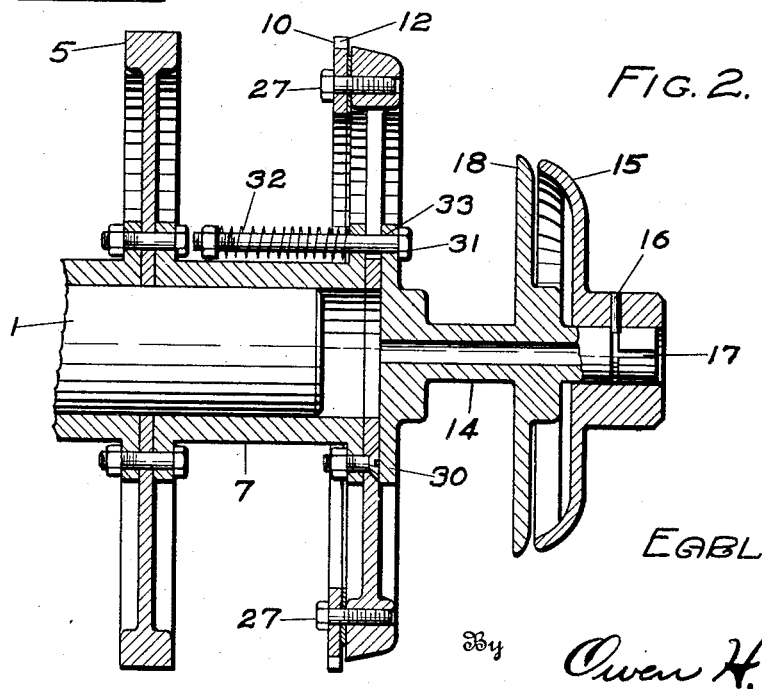
Figure 2 is a sectional view as seen along line 2—2, Fig. 4.
Figure 3:
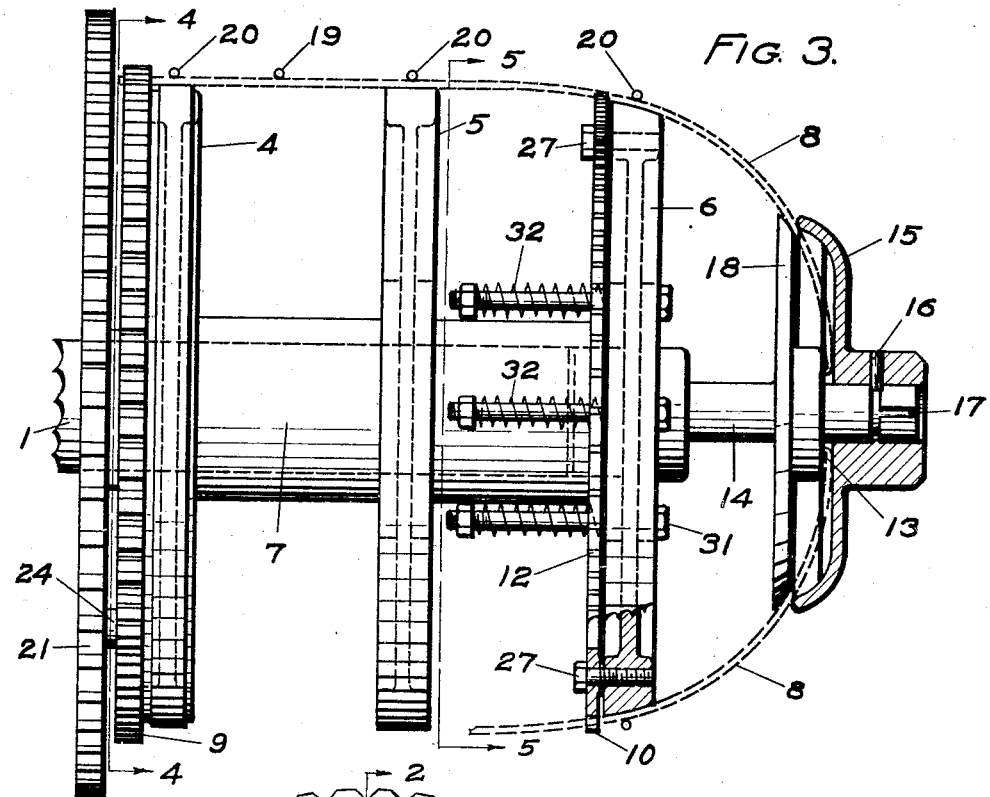
Figure 3 is an enlarged side elevation, partly in section, of the combined electrodes and shaping mechanism.
Figure 4:
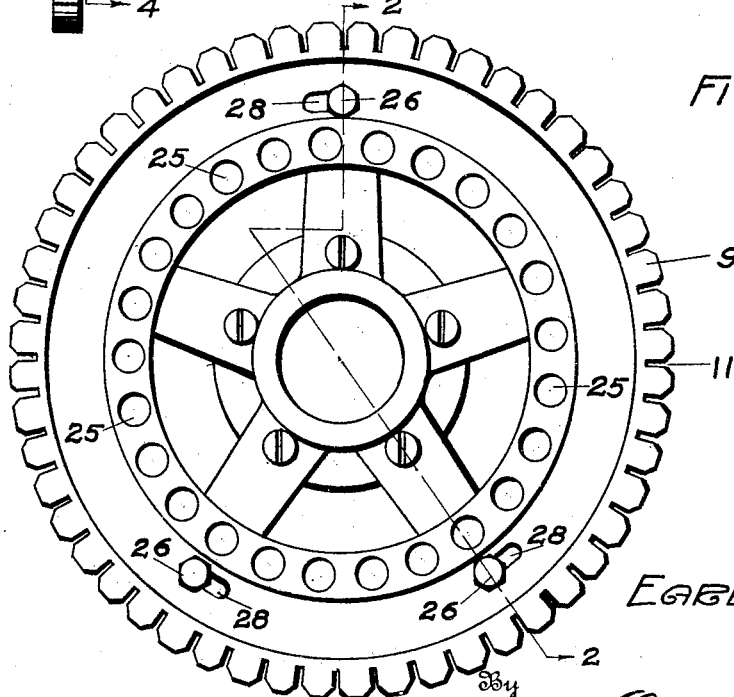
Figure 4 is an end elevational view as seen from line 4—4, Fig. 3.
Figure 5:
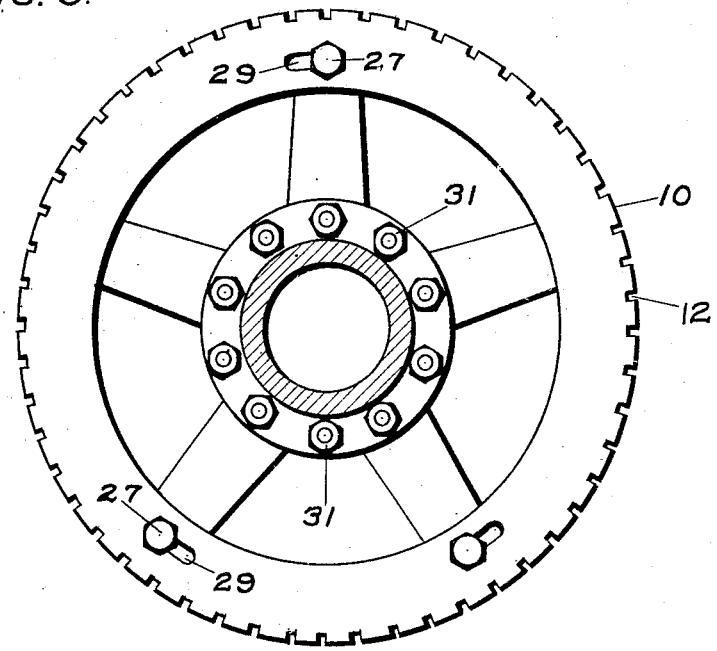
Figure 5 is a sectional view as seen along line 5—5, Fig. 3.
Figure 6:
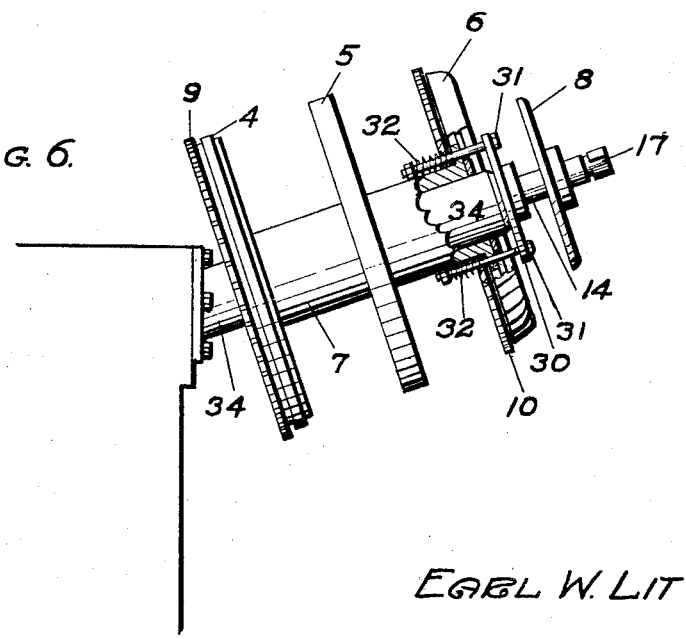
Figure 6 is an elevation, partly in section, showing the manner of releasing the cage structure from the supporting frame therefor.

Referring to the drawings in which similar reference numerals designate corresponding parts throughout the several views, the numeral 1 denotes the fixed arm of a welding machine and 2 indicates the movable arm thereof, said movable arm having a plurality of stationary electrodes 3 attached thereto, which are adapted to cooperate with electrodes 4, 5, and 6, adapted to be carried by the stationary arm 1.

The electrodes 4, 5, and 6 are preferably circular and in the nature of discs and are connected together and in spaced relation with each other by means of a sleeve 7, which sleeve fits over the arm 1 and positions the electrodes 4, 5, and 6 in registration with the electrodes 3, so that when the arm 2 is lowered, the several electrodes will be united for forming welds.

The electrodes 4, 5, and 6 are shaped to receive the wires of a cage structure 8, in this instance a bird cage, the electrodes 4 and 6 having plates 9 and 10 associated therewith, in the peripheral edges of which are formed alining notches 11 and 12, respectively through which the wires 8 are extended and by means of which the wires are uniformly and accurately spaced apart and held in spaced relation while being welded.

The several wires of the cage structure 8 are assembled and secured at one end to a ring like member 13 and this assemblage is introduced over a spindle 14 and locked in engagement therewith by means of a clamping plate 15, the hub of said clamping plate having a pin 16 which engages a slot 17 in the spindle 14 and locks the clamping plate in position on the spindle. The spindle 14 is also provided with a shaping plate 18, the edge of which is arranged to engage the wires of the cage 8 and hold the crown portion of the cage in proper curved position until after the wires are welded together. After the cage structure 8 has been introduced over the electrodes 4, 5 and 6 and the wires thereof engaged with their respective notches any suitable encircling member 19 is introduced over the wires of the cage to hold them in position until welded.

Any suitable band means 20 is positioned to be welded to the strand wires of the cage structure 8, each wire of the cage structure being preferably welded to the respective band means 20, although it will be understood that the welds may be varied as desired.

In order to automatically rotate the battery of electrodes 4, 5 and 6, a ratchet wheel 21 is mounted on the arm 1, with which cooperates a pawl 22, said pawl being operated to rotate the ratchet through the medium of a pitman 23, the upper end of which is attached to the movable arm 2, so that as said arm is swung upwardly after completing a weld, the pawl and ratchet mechanism will rotate the battery of electrodes 4, 5 and 6, together with the cage structure thereon, the proper distance to bring a new wire to welding position between the sets of electrodes. The frame or battery of electrodes formed by the series of electrodes 4, 5 and 6 is caused to rotate with the ratchet wheel 21 by providing a stud 24 on the ratchet which is adapted to engage any one of a series of holes 25 in the electrode 4, when the battery of electrodes is slipped over the arm 1 and moved inwardly until it contacts with the ratchet.

The plates 9 and 10 are preferably adjustably attached to their respective electrodes 4 and 6 by means of bolts 26 and 27, which bolts extend through elongated slots 28 and 29 in the plates 9 and 10 respectively with their inner ends threading into the respective electrodes. In this manner the plates may be shifted to position the wires of the cage structure 8 at suitable points on the peripheral surfaces of the electrodes 4, 5 and 6, should said surfaces be rendered uneven, incident to a multiplicity of welds being made at any one given point, or otherwise.

As shown, the electrodes 4, 5 and 6 act as a supporting frame for the cage structure 8 and as the cage structure is removed with the electrodes and fits more or less snugly thereon, means is provided for loosening the cage structure so that it may be readily and easily removed from the frame comprising a flange 30 at the inner end of the spindle 14, which is held against one face of the electrode 6 through the medium of bolts 31 and springs 32, the bolts passing through openings 33 in the electrode 6. In loosening the cage structure 8, the clamping plate 15 is first removed and the sleeve 7 of the frame then introduced over a bar 34 until the end of the bar strikes against the flange 30, the force of the blow moving the flange 30 and crown end of the cage structure a distance away from the frame and loosening the cage structure and leaving it free to be withdrawn from the frame.

In operation a cage structure is positioned over the frame formed by the electrodes 4, 5 and 6, with the ring like member 13 over the spindle 14, after which the clamping plate 15 is introduced over and locked to the spindle 14. The wires of the cage structure 8 are then engaged with their respective notches 11 and 12, and the encircling member 19 placed thereover to hold the wires of the cage structure in fixed position on the frame structure.

The frame structure is then introduced over the end of the arm 1 and moved inwardly until the stud 24 engages one of the holes 25 in the electrode 4, when by applying bands or the like in position to be welded and energizing the welding machine, the welding operation will be performed and by automatically operating the welding machine and automatically positioning the wires of the cage structure in position to be successively welded, the welding of the cage structure together will be completed with one complete revolution of the cage carrying frame.

While the description and drawings illustrate in a general way certain instrumentalities which may be employed in carrying the invention into effect, it is evident that many modifications may be made in the various details without departing from the scope of the appended claims, it being understood that the invention is not restricted to the particular examples herein described.

What I claim is:

1. In a welding machine, a cage supporting element, a movable spindle to which a portion of the cage structure is attached, and yieldable means for normally retaining said spindle in juxtaposition to the cage supporting element.

2. In a welding machine, a cage supporting element, a movable portion for receiving a part of the cage structure, and yielding means for normally retaining the movable portion in operative relation with the remainder of the supporting element and permit movement of the movable element for releasing the cage structure from the remainder of the supporting element.

3. In a welding machine a cage supporting element, a spindle for receiving one end of the cage forming element, and means for yieldingly attaching said spindle to said supporting element, whereby when said spindle is moved outwardly said cage structure will be released from the supporting element.

4. In a welding machine, a supporting element for cage structures, means for spacing the side forming wires of the cage structure, and means for maintaining the shape of the crown forming wires of the cage structure during the welding operation.

5. In a welding machine, a supporting element for cage structures, a spindle connected with said supporting element, a crown shaping element on said spindle, and means for locking said cage structure on said spindle and against said shaping element.

In testimony whereof, I have hereunto set my hand on this the 16th day of August, 1930.

EARL W. LITTLE.